(12) United States Patent
Slutsky et al.

(10) Patent No.: US 7,393,202 B1
(45) Date of Patent: Jul. 1, 2008

(54) PLATTER FOR THERMOPLASTIC BILLET

(75) Inventors: Amnon Slutsky, Kibbutz Maoz Haim (IL); Yaron Cina, Moshav Sarona (IL)

(73) Assignee: Polyraz Plastics Industries, Moaz Haim (IL)

( * ) Notice: Subject to any disclaimer, the term of this patent is extended or adjusted under 35 U.S.C. 154(b) by 0 days.

(21) Appl. No.: 11/626,375

(22) Filed: Jan. 24, 2007

(51) Int. Cl.
*B29C 51/42* (2006.01)

(52) U.S. Cl. .................. 425/388; 425/384; 425/397; 425/413; 425/DIG. 48

(58) Field of Classification Search .......... 425/384, 425/388, 387.1, 397, 400, 413, DIG. 48
See application file for complete search history.

(56) References Cited

U.S. PATENT DOCUMENTS

| | | | | |
|---|---|---|---|---|
| 3,466,706 A | * | 9/1969 | Asano | 269/94 |
| 3,600,746 A | * | 8/1971 | Kostur et al. | 26/1 |
| 3,827,683 A | * | 8/1974 | Seborg et al. | 269/9 |
| 3,914,103 A | * | 10/1975 | Dean et al. | 425/397 |
| 4,239,472 A | * | 12/1980 | Atkinson et al. | 425/388 |
| 4,938,678 A | * | 7/1990 | Oulman | 425/397 |
| 4,944,668 A | * | 7/1990 | Asano et al. | 425/397 |
| 5,788,453 A | * | 8/1998 | Donde et al. | 414/744.5 |
| 6,896,506 B1 | * | 5/2005 | Jordan | 425/384 |
| 7,311,513 B2 | * | 12/2007 | Schwab et al. | 425/387.1 |
| 2002/0093132 A1 | * | 7/2002 | Laughlin et al. | 269/106 |

FOREIGN PATENT DOCUMENTS

FR WO2004/007177 A1 * 1/2004 .................. 425/384

* cited by examiner

*Primary Examiner*—Yogendra Gupta
*Assistant Examiner*—Maria Veronica D Ewald
(74) *Attorney, Agent, or Firm*—Dekel Patent Ltd.; David Klein (57) ABSTRACT

A thermoforming apparatus including a pallet for use with a thermoforming machine that thermoforms a plastic billet into a usable form, the pallet including a billet support surface for supporting thereon a billet, and a gripper mounted on the pallet and arranged for movement between a first position, wherein the gripper does not grip a billet placed on the billet support surface, and a second position, wherein the gripper grips the billet placed on the billet support surface.

18 Claims, 12 Drawing Sheets

PLATTER FOR THERMOPLASTIC BILLET

FIELD OF THE INVENTION

The present invention relates generally to scrapless thermoforming of thermoplastic materials into containers and the like, and particularly to a platter for holding and transporting a thermoplastic billet in a thermoforming machine.

BACKGROUND OF THE INVENTION

A typical thermoforming machine includes a series of stages that transform thermoplastic material (e.g., polypropylene, polyvinyl chloride, polystyrene and others) into finished containers by means of heat and pressure. The finished containers are typically used to hold food, and may be formed into a variety of sizes and shapes depending on the thermoforming process.

Thermoplastic materials may be fed into a thermoforming machine in the form of a continuous sheet or as individually cut blanks or billets. When the input materials are individual thermoplastic billets, the process is called scrapless thermoforming because the finished containers need not be cut from the sheet after forming, reducing the amount of scrap material. In scrapless thermoforming, a billet feeding unit is typically used to load individual billets onto a conveying device in the machine.

Prior to being formed into containers, the billets must be heated to the desired temperature. The desired temperature depends on the structure of the machine being used as well as the desired properties of the end product. For example, containers may be formed while the thermoplastic material is below the crystalline melt point of the material, this being known as solid-phase pressure forming. Other methods involve heating the material to its melting point prior to forming, this being known as melt-phase thermoforming.

A conventional scrapless thermoforming machine has several stages used to create formed containers. First, the billets are loaded into the machine. Second, an oven is used to heat the billets to the desired temperature. Third, a form station or form press utilizes air pressure and vacuum to form the individual containers. After exiting the form press, the formed containers are removed from the machine at an unloading station. Other stations may be added to the thermoforming machine as desired, such as a pre-heating oven prior to entry into the main oven. A conveyor is typically used to transport the billets through the various stations.

Whether the containers are formed utilizing solid-phase forming or melt-phase forming, a problem that must be addressed involves the deformation of the thermoplastic material as it is heated. Because the billets are typically supported in a horizontal fashion with only peripheral supports beneath each billet due to the configuration of the form press, the billets tend to sag or droop between the supports when heated. In some cases, the billets may entirely fall out of their supports when heated due to the material deformation.

The thermoforming art has tried many methods of preventing material deformation from adversely impacting the thermoforming process. One method involves minimizing the size of the billets. This method prevents the formation of larger containers. Another method is to utilize round billets such that the resultant uniform deformation allows the support to retain the billet during heating. This method precludes the forming of containers having a non-uniform cross-section, such as rectangular or oval containers. Yet another method of addressing the deformation issue is to utilize a ring placed on top of the billet to strengthen the frictional grip on the billet during heating. This method presents additional manufacturing challenges with respect to how to efficiently place individual rings on top of each billet during the loading process.

An example of a prior art frame for holding a billet is U.S. Pat. No. 6,896,506 to Jordan, which describes a thermoforming machine that includes a loading station configured to load a thermoplastic billet onto a frame. The frame has an outer ring and a billet support blade defining a channel therebetween. The billet support blade engages the billet to maintain the billet on the frame during heating of the billet. A heating apparatus is configured to heat the billet and a forming station is configured to form the billet into a container.

SUMMARY OF THE INVENTION

The present invention seeks to provide a novel platter (or frame, the terms being used interchangeably throughout) for holding and transporting a thermoplastic billet in a thermoforming machine, as is described more in detail hereinbelow. A novel thermoforming machine that uses the platters is also described.

BRIEF DESCRIPTION OF THE DRAWINGS

The present invention will be understood and appreciated more fully from the following detailed description, taken in conjunction with the drawings in which:

FIGS. 2A-2E are simplified illustrations of a pallet, which may be used in the thermoforming machine of FIG. 1A, constructed and operative in accordance with an embodiment of the present invention, wherein FIGS. 2A and 2B are respective pictorial and top-view illustrations of the pallet.

FIGS. 3A-3D are simplified illustrations of a pallet, which may be used in the thermoforming machine of FIG. 1A, constructed and operative in accordance with another embodiment of the present invention, wherein FIGS. 3A and 3B are respective pictorial and top-view illustrations of the pallet.

FIGS. 5A-5C are simplified illustrations of the pallet of FIG. 4, with a billet placed thereupon and not yet gripped by the grippers, wherein FIGS. 5A and 5B are respective pictorial and top-view illustrations of the pallet (FIG. 5B showing a cam frame in a first position where the grippers do not grip the billet)

FIGS. 6A-6C are simplified illustrations of the pallet of FIG. 4, with the billet gripped by the grippers, wherein FIGS. 6A and 6B are respective pictorial and top-view illustrations of the pallet (FIG. 6B showing a cam frame in a second position where the grippers grip the billet)

FIGS. 7A-7D are simplified illustrations of the pallet of FIG. 4, with the billet gripped by the grippers and moved to one of the heating stations (pre-heating or main heating stations) of the thermoforming machine, wherein FIGS. 7A and 7B are respective pictorial and top-view illustrations of the pallet and heating element.

FIGS. 8A-8D are simplified illustrations of the pallet of FIG. 4, with the billet gripped by the grippers and moved to the pressure vacuum station of the thermoforming machine, wherein FIGS. 8A and 8B are respective pictorial and top-view illustrations of the pallet and upper pressure unit.

FIGS. 9A-9D are simplified illustrations of the pallet of FIG. 4, wherein

FIGS. 10A-10D are simplified illustrations of the pallet of FIG. 4, wherein FIGS. 11A-11C are simplified illustrations of a pallet, constructed and operative in accordance with still another embodiment of the present invention, wherein

DETAILED DESCRIPTION OF EMBODIMENTS

Figure 1A:
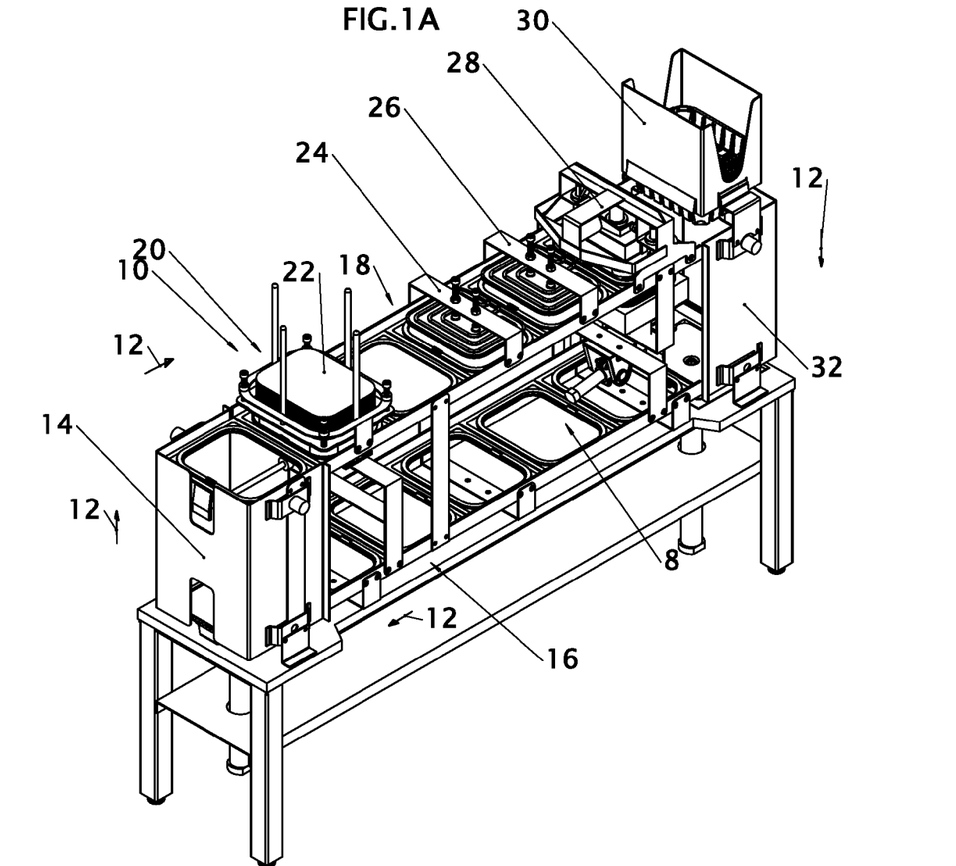
FIG. 1A is a simplified pictorial illustration of a thermoforming machine, constructed and operative in accordance with an embodiment of the present invention.

Reference is made to FIG. 1A, which illustrates a thermoforming machine 10, constructed and operative in accordance with a non-limiting embodiment of the present invention.

Thermoforming machine 10 may include a plurality of stations for storing, transporting and scraplessly transforming billets (thermoplastic blanks) into containers or other items. The direction of the work flow is indicated by arrows 12. The billets are held and transported in pallets 8, embodiments of which are described in detail further below.

At one end of thermoforming machine 10 may be a front platter lift station 14. Pallets 8 may enter station 14 from a lower conveyor 16. The pallets 8 may be lifted in station 14 to an upper level, where they exit to an upper conveyor 18. The first station on the upper conveyor 18 is a loading station 20 that loads pre-cut foils 22, herein referred to as billets 22, onto pallets 8. Billets 22 may be constructed of any thermoplastic material capable of being formed into containers by means of heat and pressure, such as but not limited to, polypropylene.

After one of the billets 22 is loaded into one of the pallets 8, the pallet 8 may move to a preheating station 24, which performs initial heating of the billet 22. Afterwards, the billet 22 may pass to a main heating station 26 for additional heating. The billet 22 may be heated to a temperature permitting solid-phase thermoforming, for example, at the next station, which is a pressure vacuum station 28.

The pressure vacuum station 28 may include a plug assist, which is well known in the art and available from many manufacturers, for forming thermoplastic containers from individual billets 22. As is known in the art, the plug assist lowers a forming tool into the heated billet 22, pushing billet 22 down into a form cavity that is of the final desired container shape. Air pressure and/or vacuum may be used to help pull or push billet 22 into the form cavity. The form cavity may then be removed and the finished container may be ejected to a tray stacking station 30. The pallets 8 may be conveyed by a rear platter lift station 32 downwards to the lower conveyor 16, which conveys the pallets 8 back to the front platter lift station 14 to start the next cycle.

Figure 1B:
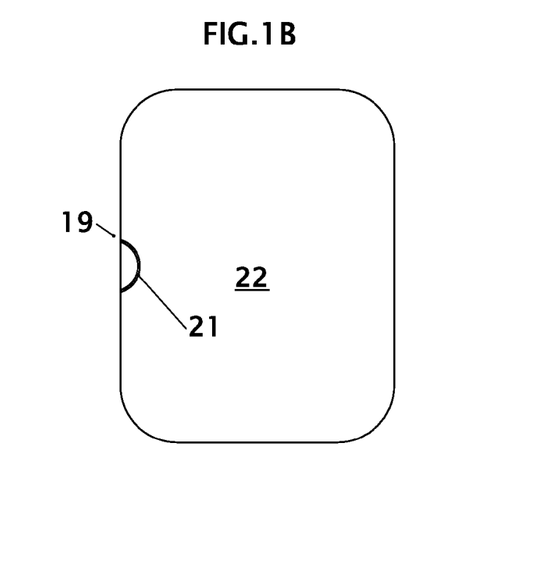
FIG. 1B is a simplified pictorial illustration of a billet that may be formed with the thermoforming machine of FIG. 1A, in accordance with an embodiment of the present invention.

Reference is now made to FIG. 1B, which illustrates one kind of billet 22 that may be formed with the thermoforming machine of FIG. 1A, in accordance with an embodiment of the present invention. The billet 22 shown in FIG. 1B is a generally rectangular sheet which may have rounded corners. The billet 22 includes a feeder element 19. One non-limiting example of feeder element 19 is a depression 21 formed at the edge of one of the sides of the billet 22. The feeder element 19 allows one individual billet to be picked from the stack of billets and fed into the pallet, as is described below with reference to FIGS. 2A and 2B (and may be included in the other embodiments of the invention).

Reference is now made to FIGS. 2A-2E, which illustrate a pallet 108, which may be used in the thermoforming machine 10, constructed and operative in accordance with an embodiment of the present invention.

Figure 2A:
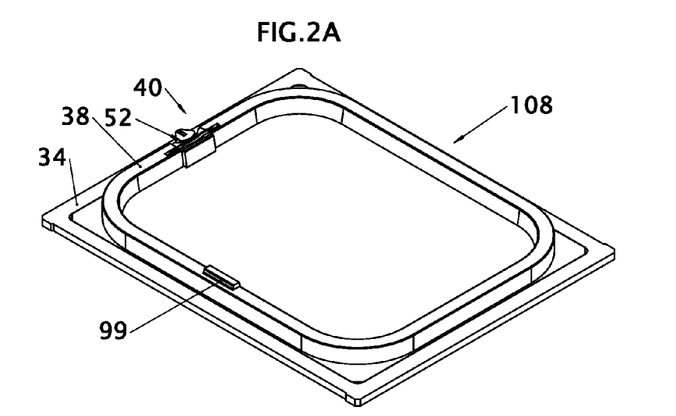
Figure 2B:
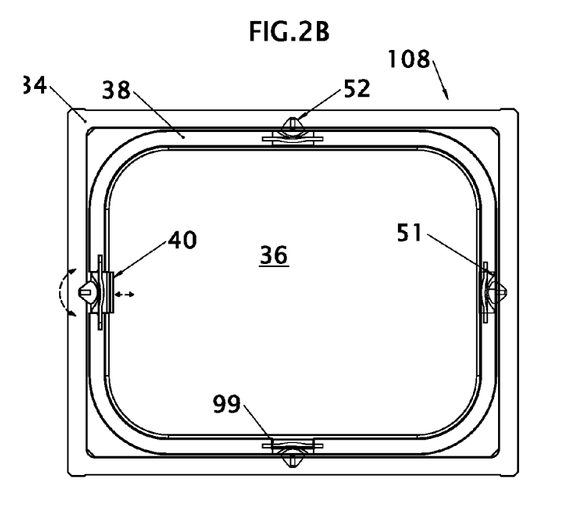
Figure 2C:
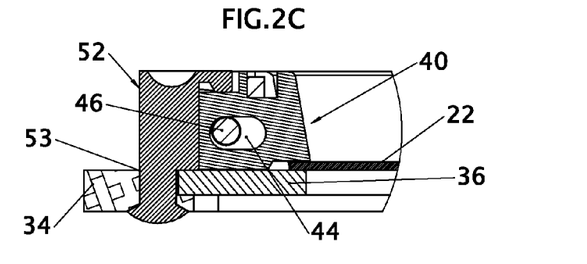
FIG. 2C is a sectional view of a gripper of the pallet that is used to grip a billet and FIGS. 2D and 2E are details of parts of the gripper.
Figure 2D:
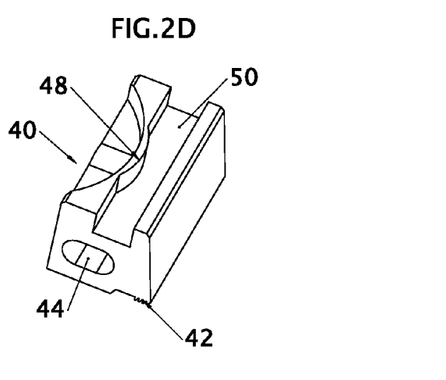
Figure 2E:
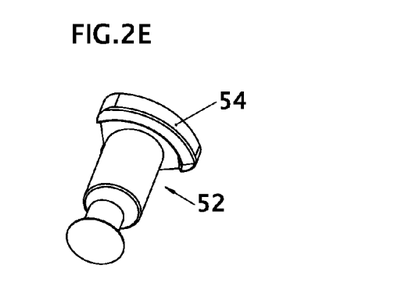

Pallet 108 may include a tray 34 with a peripheral billet support surface 36. The billet support surface 36 may support a peripheral underside of billet 22 (and thus not touch the portions of the finished container that are readily visible to a consumer or end user of the container). A frame 38 may extend from tray 34, which may be sized to the size of the billet 22. At different points on the frame 38 (such as on each of its four sides, not all of which are shown in FIG. 2A for the sake of simplicity), may be positioned grippers 40. In this embodiment, gripper 40 (seen best in FIG. 2D) may include a billet-gripping surface 42 (which may be roughened as shown in FIG. 2D), designed to pass over and press against the billet 22. Gripper 40 may be formed with an oval aperture 44, through which passes a pin 46 (FIG. 2C). Gripper 40 may have a curved abutment 48 that extends slightly into a channel 50. A leaf spring 51 (FIG. 2B) or other suitable biasing device may be disposed in channel 50. A tightening cam 52 (FIG. 2E) is rotatingly mounted in a hole 53 (FIG. 2C) of tray 34 and has a cam head 54 that is positioned to turn against curved abutment 48. Cam head 54 may be fashioned with a screwdriver slot for facilitating turning thereof. Thermoforming machine 10 may include a screwdriver-blade-type actuator at loading station 20 for closing cam head 54 against curved abutment 48 and another actuator at station 28 for opening the cam head 54 to release the billet 22.

Pallet 108 may include a billet-picking member 99, which is arranged to pick one individual billet from the stack of billets and feed that billet into pallet 108. Billet-picking member 99 may include a bar or other suitable protrusion on one of the long sides of frame 38. At loading station 20, each individual billet must be fed from the stack of billets to an individual pallet. In the present invention, unlike the prior art, there is no active device at loading station 20 that pushes a billet into the pallet. Instead, in the present invention, this may be accomplished by moving pallet 108 past the bottom billet of the stack of billets, whereby billet-picking member 99 moves into the depression 21 of the bottom billet and "sweeps" the bottom billet away from the rest of the stack into the pallet 108. Thus, the pallet is self-loading—it itself loads the billet therein.

In the position shown in FIG. 2C, tightening cam 52 has been turned against curved abutment 48 so that gripper 40 slides over billet 22 (to the right in the sense of FIG. 2C) and presses it against billet support surface 36 of tray 34. In order to release the billet 22, tightening cam 52 should be turned away from curved abutment 48 so that leaf spring 51 pushes gripper 40 off billet 22 (to the left in the sense of FIG. 2C). Generally, the grippers 40 hold the periphery of billet 22 during thermoforming at station 28 (FIG. 1A) and are released to allow removal of the finished container.

Reference is now made to FIGS. 3A-3D, which illustrate a pallet 208, which may be used in the thermoforming machine 10, constructed and operative in accordance with another embodiment of the present invention.

Figure 3A:
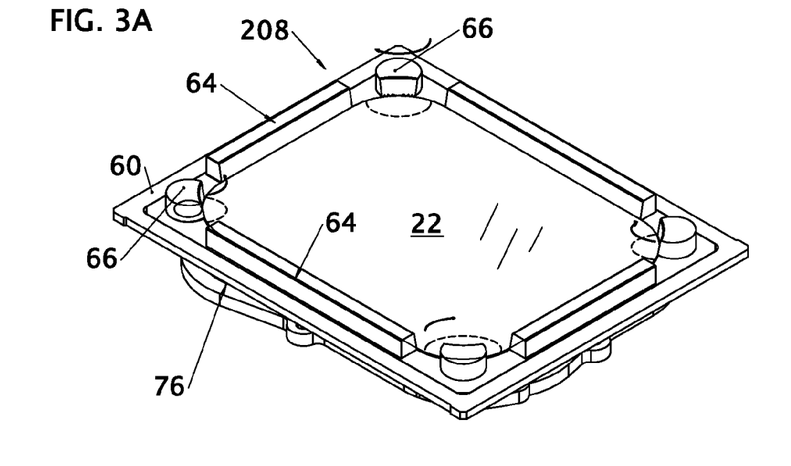
Figure 3B:
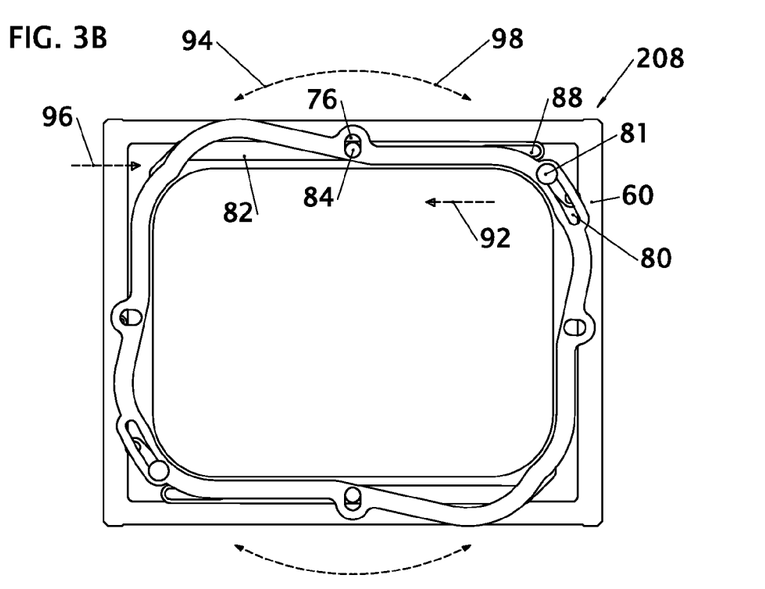
Figure 3C:
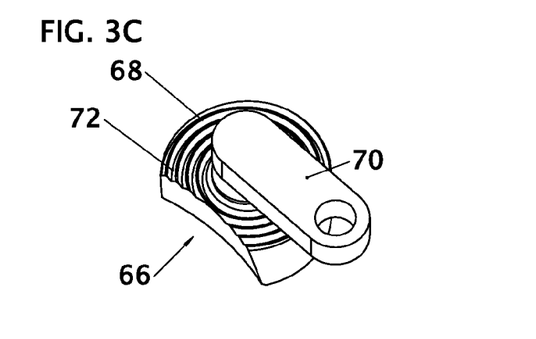
FIG. 3C is a detailed pictorial illustration of a gripper of the pallet that is used to grip a billet.
Figure 3D:
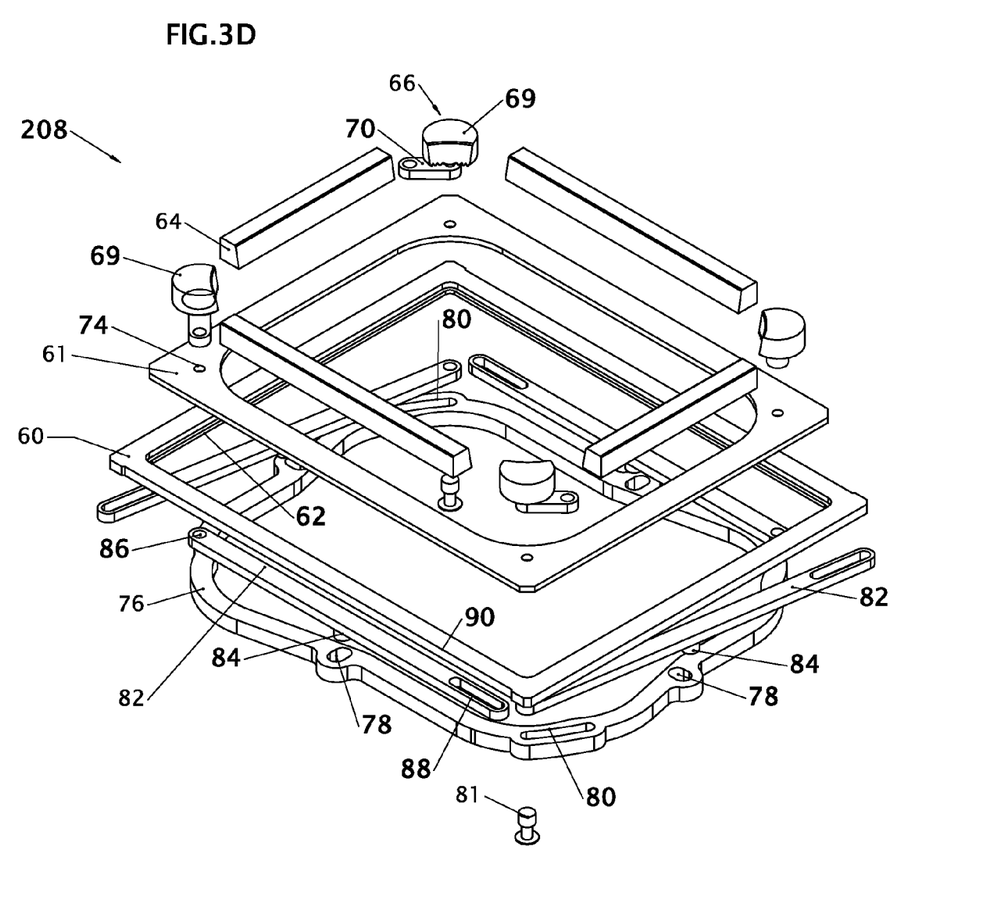
FIG. 3D is an exploded illustration of the pallet.

Pallet 208 may include a tray 60 with a peripheral billet support surface 62. Billet boundary members 64 may extend from an inner frame 61 (four are shown in FIG. 3D) affixed to tray 60, members 64 being arranged and spaced to the size of the billet 22. At different points on one side of the tray 60 (such as at each of the four corners), may be positioned grippers 66. In this embodiment, gripper 66 (seen best in FIG. 3C) may include a curved cam head 68 mounted by means of a post 69 on an arm 70. Gripper 66 may have a billet-gripping surface 72 (which may be spiral or otherwise roughened as shown in FIG. 3C), designed to pass over and press against the billet 22. Gripper 66 is on the upper side of tray 60 (so that it can swing over and hold a billet), whereas post 69 may pivot by means of a pin (not shown) that goes through a hole 74 formed in frame 61 (FIG. 3D) and connects to arm 70 which is on the underside of tray 60.

A cam frame 76 may be positioned on the lower side of tray 60. Cam frame 76 may be formed with an aperture 78 at the middle of each of its four sides and an elongate cam aperture 80 at two opposing corners thereof. A guide pin 81 extending from tray 60 is received in cam aperture 80 to guide movement of cam frame 76. A plurality of actuator arms 82 (four are used in the illustrated embodiment) may be in operative communication with cam frame 76 by means of pegs 84 that fit into apertures 78. Each actuator arm 82 has a hole 86 formed at one end thereof to which arm 70 is pivotally attached. Each actuator arm 82 also has an elongate aperture 88 formed at another end thereof and a guide member 90 depending from tray 60 slides in aperture 88.

The operation (closing and opening) of pallet 208 is now described with reference to FIG. 3B. One of the actuator arms 82 may be moved in the direction of an arrow 92. The actuator arm 82 may be moved by any suitable moving means (not shown), such as but not limited to, a linear actuator, piston, step motor, etc., positioned at stations 20 (for closing pallet 208) and 28 (for opening pallet 208). Only one of the actuator arms 82 need be linked to the moving means because the other actuator arms move together with that one arm; however, other arms may be connected to moving means as well.

Moving the actuator arms 82 in the direction of arrow 92 causes cam frame 76 to pivot about the center of tray 60, as indicated by arrow 94. The motion of arms 82 is transferred to cam frame 76 by pegs 84 that fit into apertures 78. The motion is guided by means of guide pin 81 that slides in cam aperture 80 and by means of guide member 90 (not seen in FIG. 3B) that slides in aperture 88. The motion of arms 82 also turns grippers 66, by means of arms 70 that are connected to hole 86, so that grippers 66 swing over and grab billet 22 (this position being indicated by the broken lines 65 in FIG. 3A). When grippers 66 have been turned to hold billet 22, guide pin 81 has traveled to the opposite end of cam aperture 80 and is geometrically locked thereat to hold and lock grippers 66 in place. Releasing the grippers 66 is done by reversing the process. Accordingly, moving the actuator arms 82 in the direction of arrow 96 (opposite to 92) causes cam frame 76 to pivot about the center of tray 60, as indicated by arrow 98 (opposite to 94). As before, generally the grippers 66 hold the periphery of billet 22 during thermoforming at station 28 (FIG. 1A) and are released to allow removal of the finished container.

In a non-limiting summary so far, the gripper of the pallet of FIGS. 2A-2E is arranged for linear movement between a first position, wherein the gripper does not grip a billet placed in the pallet, and a second position, wherein the gripper grips the billet placed in the pallet. The gripper grips the billet by pressing the billet against a billet support surface of the pallet. The gripper of the pallet of FIGS. 3A-3D is arranged for rotational movement between a first position, wherein the gripper does not grip a billet placed in the pallet, and a second position, wherein the gripper grips the billet placed in the pallet. The gripper grips the billet by pressing the billet against a billet support surface of the pallet.

In the gripper of the pallet of FIGS. 2A-2E, each individual gripper is actuated to move between the first and second positions. In the gripper of the pallet of FIGS. 3A-3D, a plurality of grippers are actuated together (by the action of the cam frame and actuator arms) to move between the first and second positions.

In the gripper of the pallet of FIGS. 2A-2E, the gripper is held in place in the second positions by means of a biasing device (e.g., leaf spring 51). In the gripper of the pallet of FIGS. 3A-3D, the grippers are held in place in the second positions by means of geometric locking (e.g., guide pin 81 being geometrically locked at one end of cam aperture 80).

Figure 4:
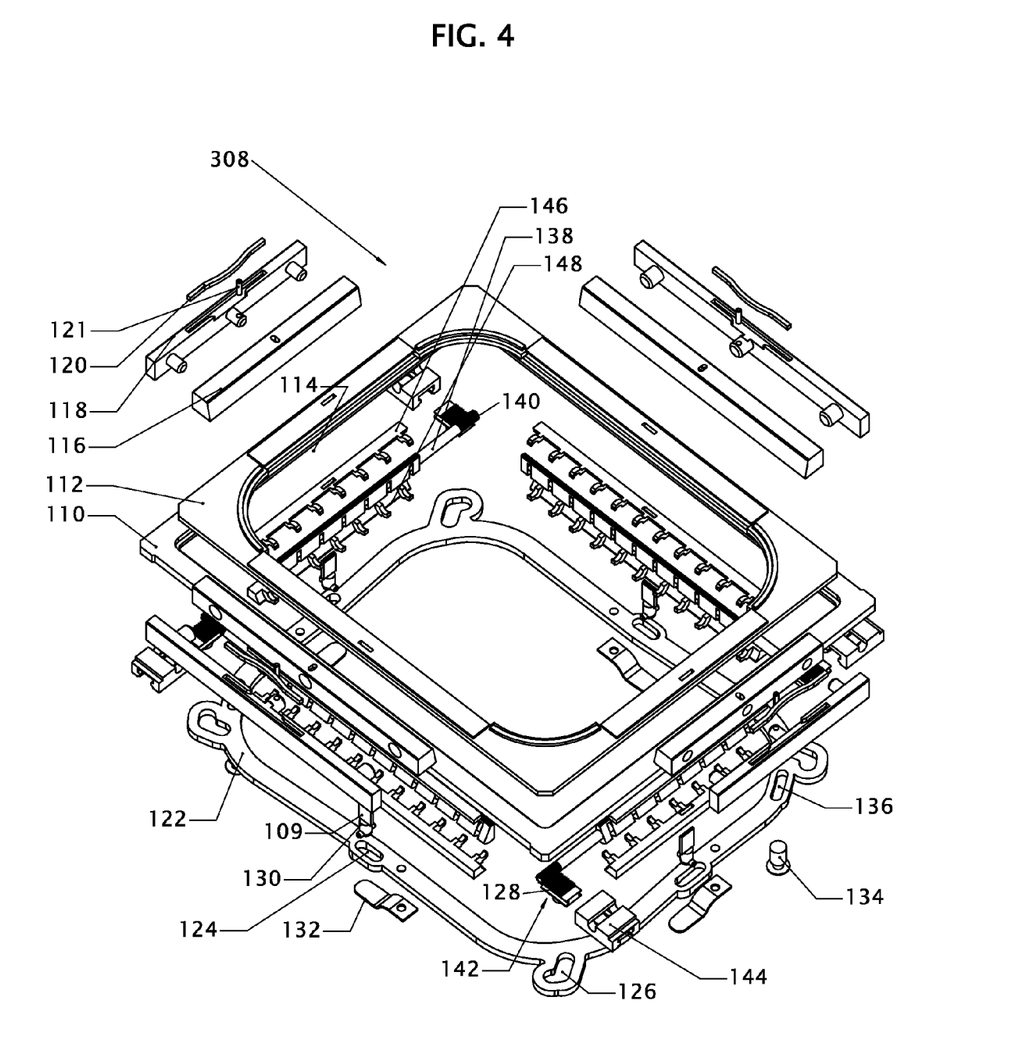
FIG. 4 is a simplified exploded illustration of a pallet, constructed and operative in accordance with yet another embodiment of the present invention.

Reference is now made to FIG. 4, which illustrates a pallet 308, constructed and operative in accordance with yet another embodiment of the present invention. As will be explained further below, this embodiment combines some of the features of the embodiments described above and adds some of its own.

Pallet 308 may include a tray 110 together which is assembled an inner frame 112 that has a peripheral billet support surface 114. Grippers 116 (four are shown in FIG. 4) may be mounted on frame 112 and arranged for linear motion inwards towards and outwards from the center of tray 110. A guide member 118 may be assembled with gripper 116. Guide member 118 may be biased by a biasing device, such as a leaf spring 120, and may have its linear movement limited by a pin 121 that slides in a slot 119 of gripper 116. Gripper 116 is arranged to pass over and press against a billet, as described below.

A cam frame 122 may be positioned on the lower side of tray 110. Cam frame 122 may be formed with an aperture 124 at the middle of each of its four sides and a L-shaped cam aperture 126 at corners thereof. Gripper 116 may be in operative communication with cam frame 122 by means of a holding tooth 130 that fits into aperture 124. Holding tooth 130 has a shaft 109 that can enter a groove 111 (not seen in FIG. 4, but seen in FIG. 5A) in gripper 116 so as to hold gripper 116 in place (as will be described further below). The holding tooth 130 may be biased by a biasing device, such as a leaf spring 132. The swivel movement of cam frame 122 may be guided by a swivel pin 134 that is received in an elongate oval aperture 136 formed in cam frame 122.

Pallet 308 may further include an under-billet gripper 138, which may be a rod with a gear teeth 140 formed at ends thereof. Gear teeth 140 mesh with a cogwheel rail 142 which is actuated (moved back and forth) by movement of cam frame 122. This may be accomplished by means of a pin 128 which depends from cogwheel rail 142 and is received in cam aperture 126. The cogwheel rail may be supported by a support guide 144. The linear motion of cogwheel rail 142 imparts rotary motion to under-billet gripper 138. Under-billet gripper 138 may include upper and lower hinges 146 and 148, respectively.

The operation of pallet 308 is now described with reference to FIGS. 5A-11D.

Figure 5A:
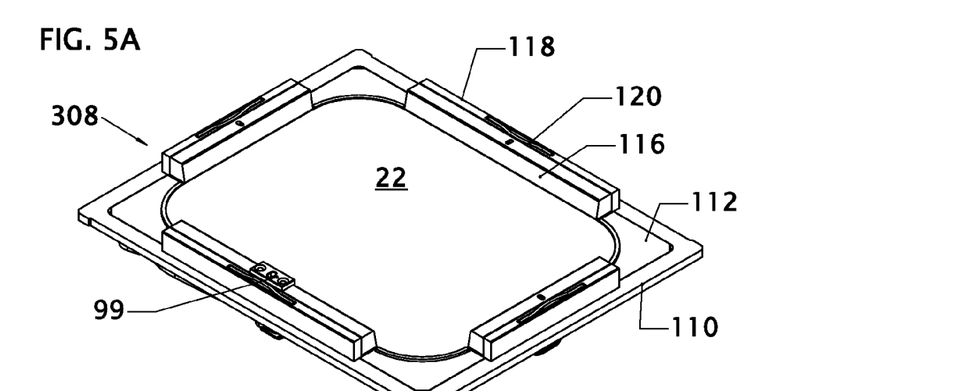
Figure 5B:
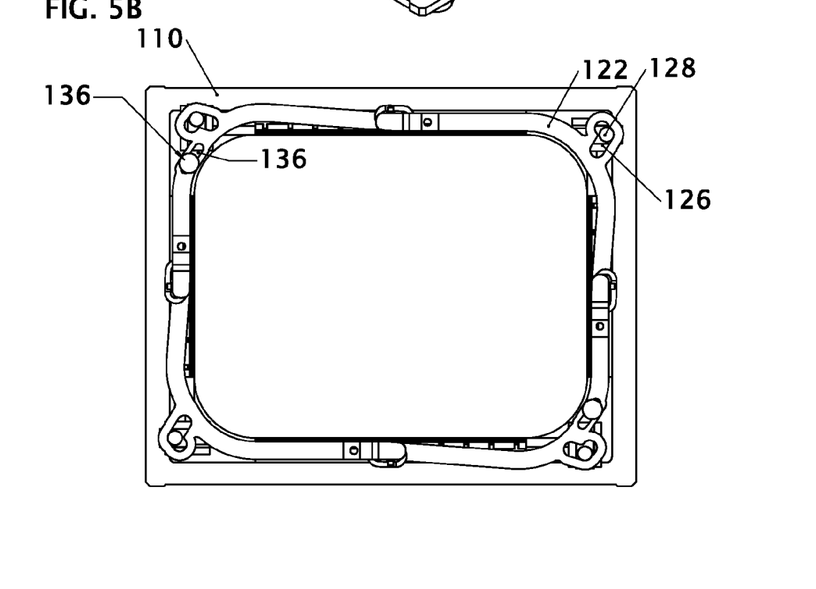
Figure 5C:
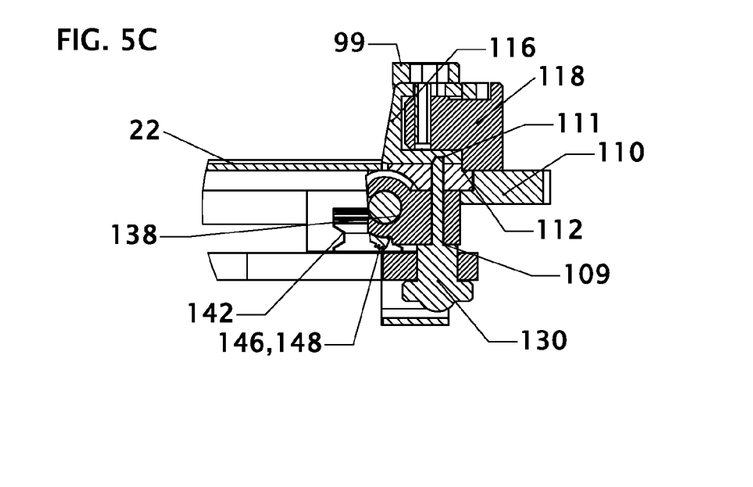
FIG. 5C is a sectional illustration of the gripper and actuator system for moving the gripper.

Reference is now made to FIGS. 5A-5C, which illustrate billet 22 placed upon pallet 308. The billet 22 is supported on surface 114 of frame 112 and is not yet gripped by grippers 116. Pin 128 is in an "idle" position in cam aperture 126.

Figure 6A:
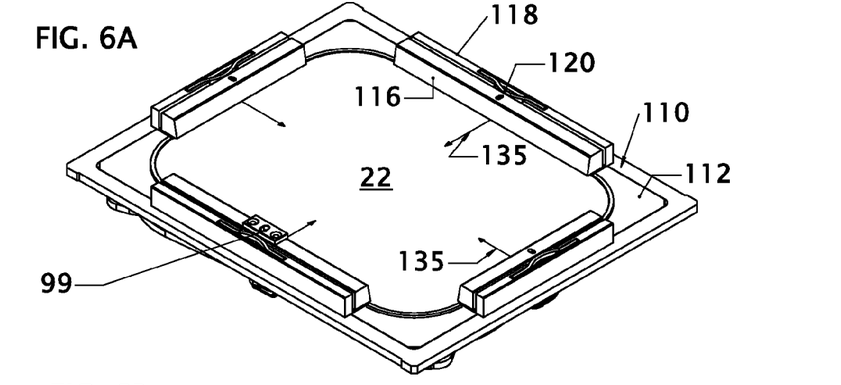
Figure 6B:
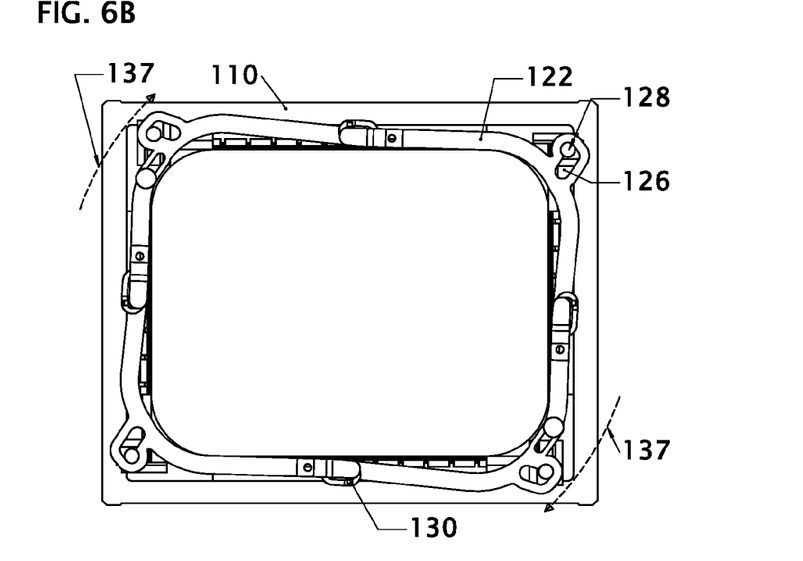
Figure 6C:
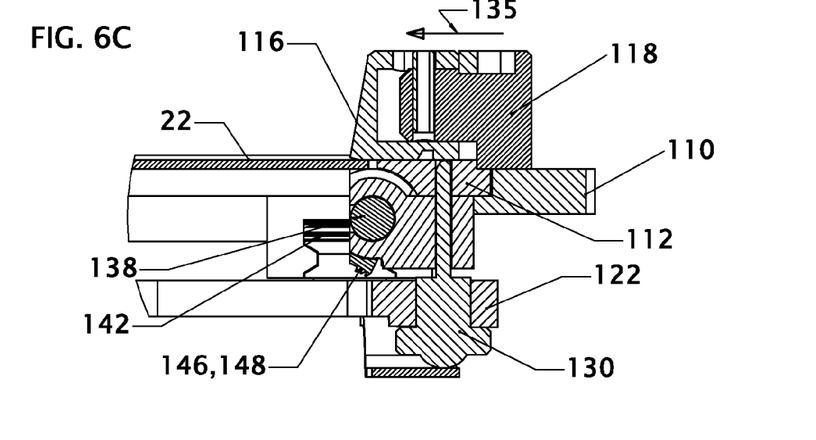
FIG. 6C is a sectional illustration of the gripper and actuator system showing the gripper gripping the billet (on the top side of the billet)
Figure 7A:
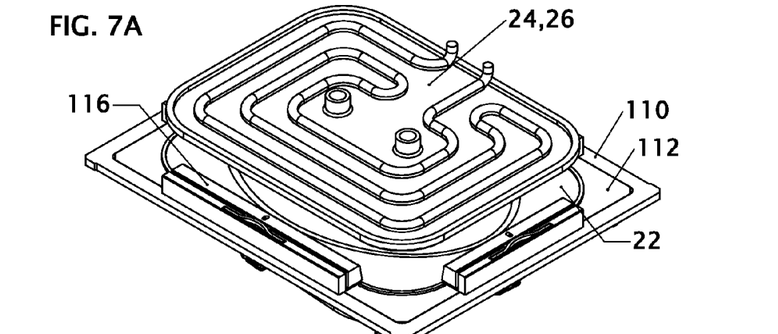
Figure 7B:
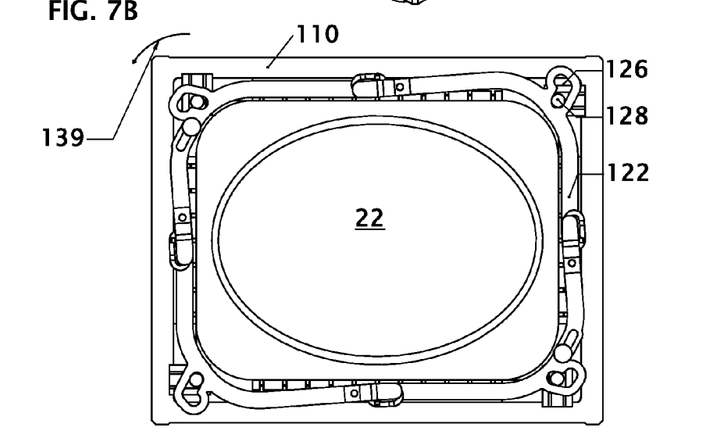
Figure 7C:
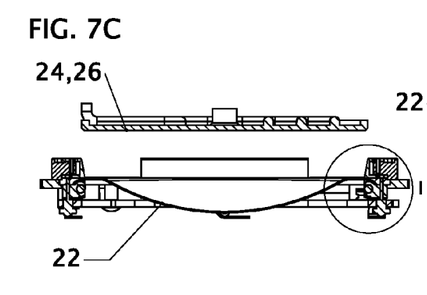
FIG. 7C is a sectional illustration of the pallet showing the billet softened by the heating with a middle section of the billet sagging down.
Figure 7D:
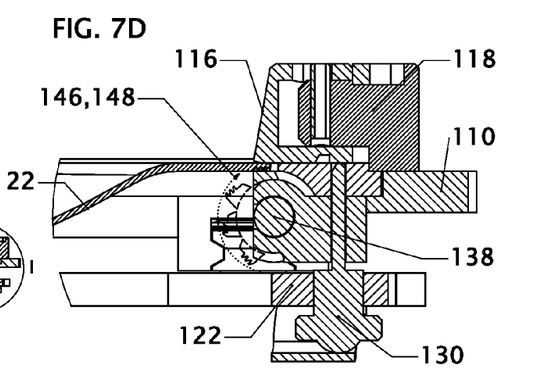
FIG. 7D is a sectional illustration of the gripper and an undersheet gripper being moved to grip the billet from its underside.
Figure 8A:
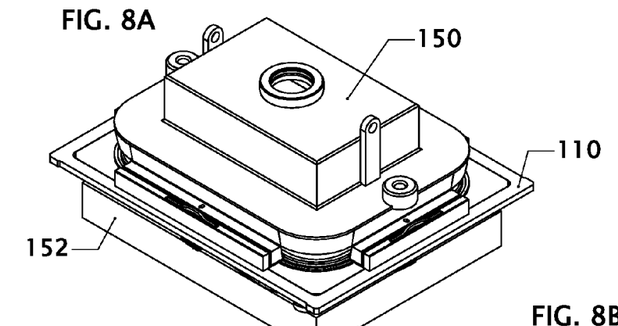
Figure 8B:
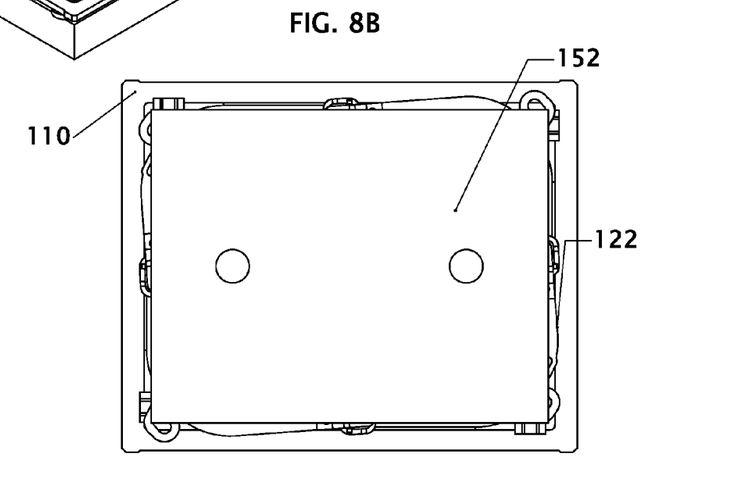
Figure 8C:
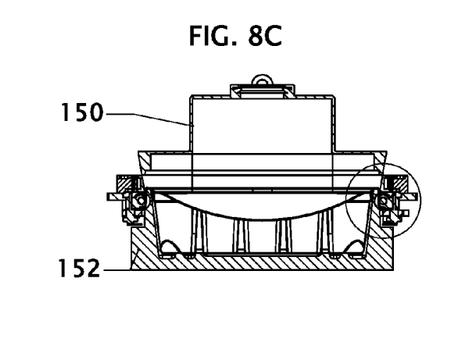
FIG. 8C is a sectional illustration of the pallet showing the upper pressure unit and a lower vacuum molding unit prior to forming the billet into a container.
Figure 8D:
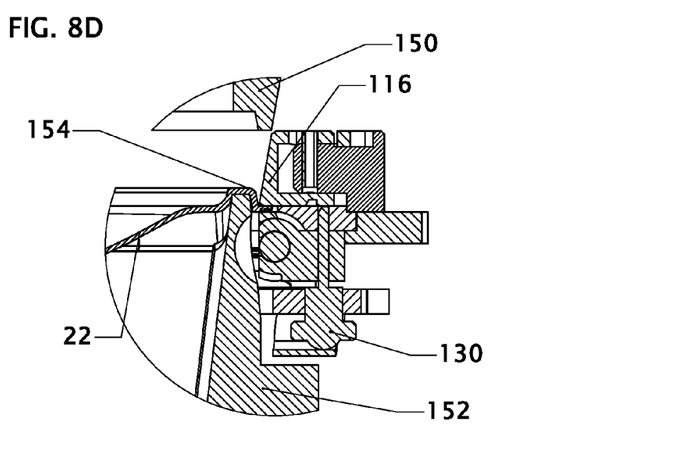
FIG. 8D is a sectional illustration of the gripper and the undersheet gripper gripping the billet during forming thereof.
Figure 9A:
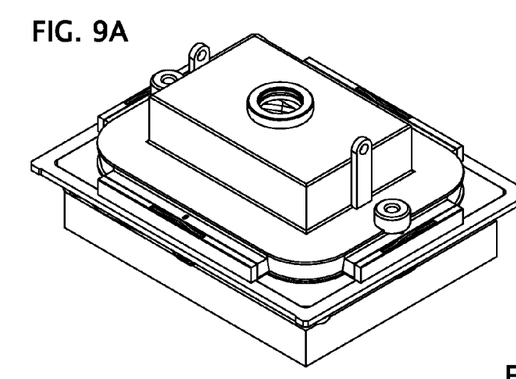
FIGS. 9A and 9B are respective pictorial and top-view illustrations of the pallet and upper pressure unit (the latter omitted in FIG. 9B)
Figure 9B:
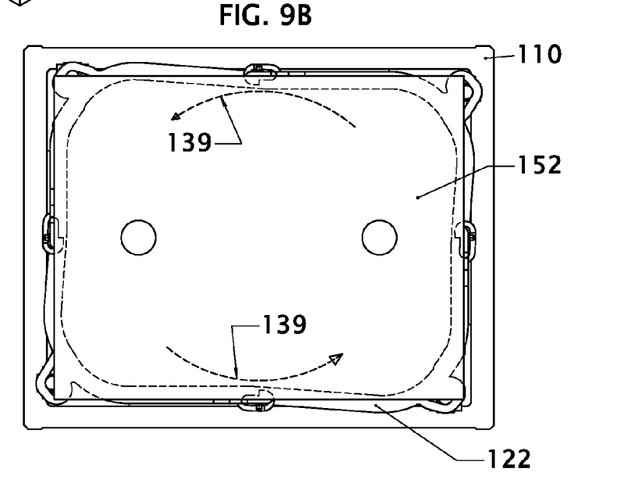
Figure 9C:
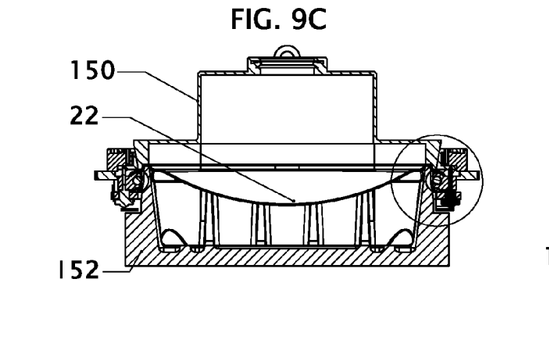
FIG. 9C is a sectional illustration of the pallet showing the billet being formed into a container by the upper pressure unit and lower vacuum molding unit.
Figure 9D:
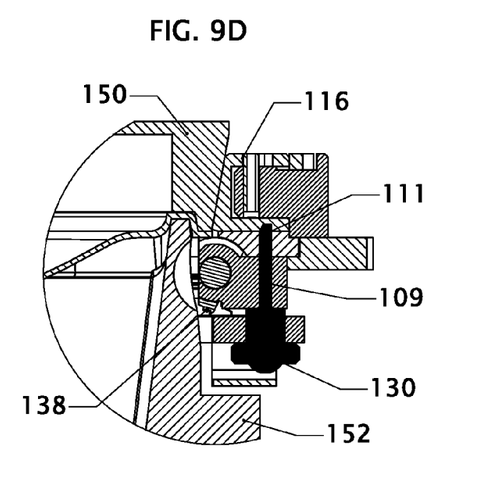
FIG. 9D is a sectional illustration of the gripper and the undersheet gripper, which do not grip the billet but rather are moved outwards by the upper pressure unit, and wherein the billet is held by the upper pressure unit.
Figure 10A:
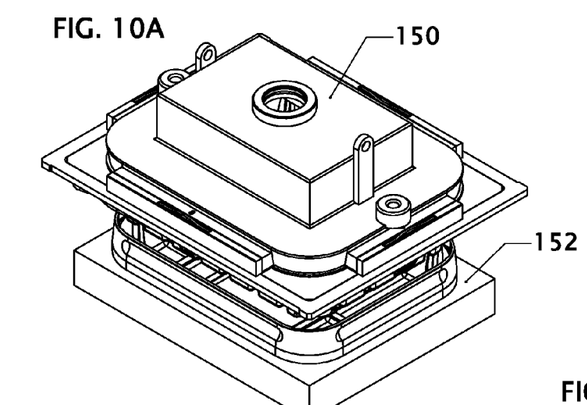
FIGS. 10A and 10B are respective pictorial and top-view illustrations of the pallet and upper pressure unit (the latter omitted in FIG. 10B)
Figure 10B:
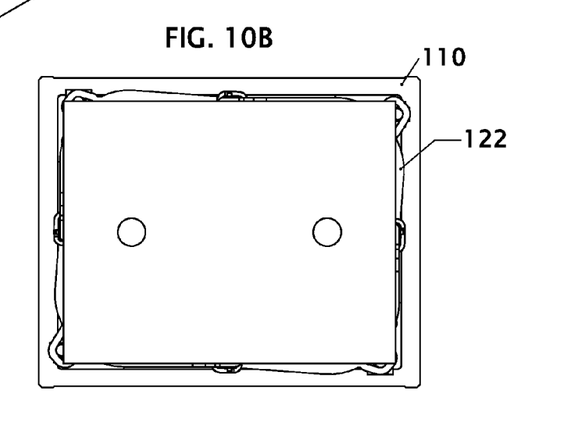
Figure 10C:
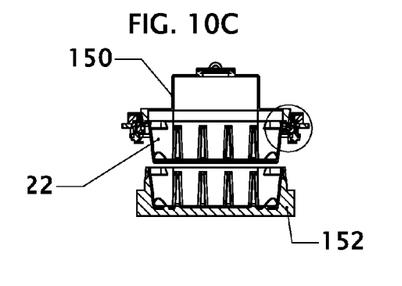
FIG. 10C is a sectional illustration of the pallet showing the lower vacuum molding unit removed downwards from the billet (now container), the container being by the upper pressure unit.
Figure 10D:
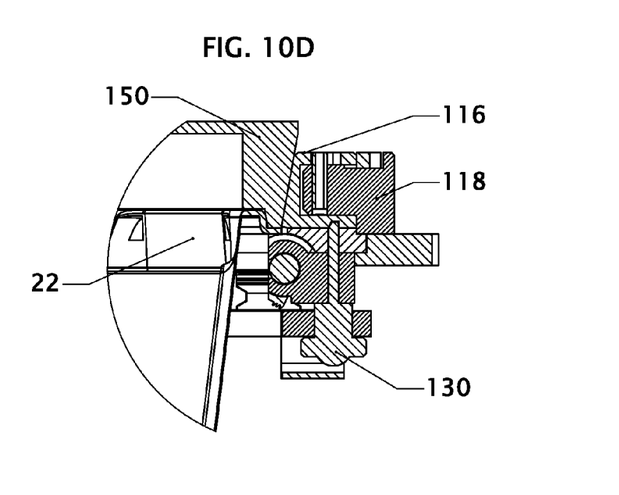
FIG. 10D is a sectional illustration of the upper pressure unit holding the edge of the container.

Reference is now made to FIGS. 6A-6C. The cam frame 122 may be swiveled to pivot about the center of tray 110, as indicated by arrows 137. The swiveling motion may be imparted to cam frame 122 by any suitable moving means (not shown), such as but not limited to, a linear actuator, piston, step motor, etc., positioned at stations 20 (for closing pallet 308) and 28 (for opening pallet 308). The swivel motion of cam frame 122 causes holding teeth 130 to move grippers 116 linearly towards the center of tray 110 and over billet 22, as indicated by arrows 135. The movement of grippers 116 is guided by guide members 118. In this manner, billet 22 is now gripped by grippers 116. It is noted that the grippers 116 are locked in place by the action of the biasing device 120. This will permit further movement of cam frame 122 to actuate the under-billet grippers 138. Pin 128 is now at one of the ends of cam aperture 126.

Reference is now made to FIGS. 7A-7D, which illustrate billet 22 gripped by grippers 116 and moved to one of the heating stations (pre-heating or main heating stations 24 or 26, respectively) of the thermoforming machine 10 of FIG. 1. Cam frame 122 has been swiveled in a direction indicated by arrow 139 and this motion causes the under-billet grippers 138 to rotate, together with upper and lower hinges 146 and 148, so as to grip the peripheral edges of the underside of billet 22. Billet 22 has now sagged in the middle on account of the heating.

Reference is now made to FIGS. 8A-8D, which illustrate billet 22 gripped by grippers 116 and moved to pressure vacuum station 28 of thermoforming machine 10. An upper pressure unit 150 is poised to move down on billet 22, and a lower vacuum molding unit 152 that has been moved up to and against billet 22 from the underside thereof. The pressure of the lower vacuum molding unit 152 against billet 22 and the gripping of the peripheral edges by grippers 116 form a shoulder 154 on billet 22.

Reference is now made to FIGS. 9A-9D, which illustrate upper pressure unit 150 having been moved down on billet 22. The upper pressure unit 150 displaces grippers 116 outwards (overcoming leaf springs 120). The top of billet 22 is now held by the upper pressure unit 150 and not by grippers 116. By the application of pressure and vacuum, the molding units form a container out of billet 22. Cam frame 122 may then be further swiveled in the direction indicated by arrow 139 and this motion causes the under-billet grippers 138 to rotate, together with upper and lower hinges 146 and 148, so as to release their grip on the billet 22 (which has been formed into a container). The top peripheral edges of billet/container 22 are still held by the upper pressure unit 150. The motion of cam frame 122 moves each holding tooth 130 upwards and shaft 109 of the holding tooth 130 re-enters groove 111 in gripper 116 so as to hold gripper 116 in place.

Reference is now made to FIGS. 10A-10D, which illustrate removal of the lower vacuum molding unit downwards from the billet/container 22. Again, the billet/container 22 is still held by the upper pressure unit 150.

Figure 11A:
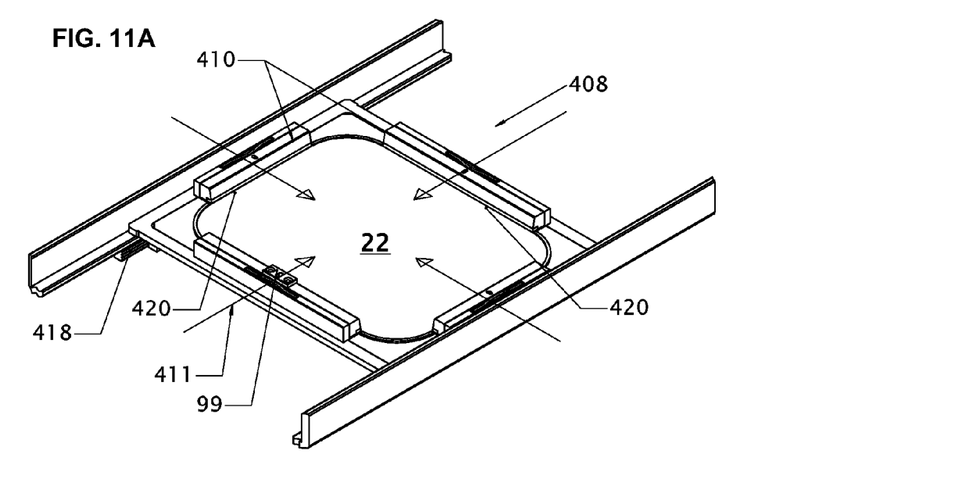
FIG. 11A is a pictorial illustration of the pallet with shape-changing grippers, such as piezoelectric or bimetallic grippers.
Figure 11B:
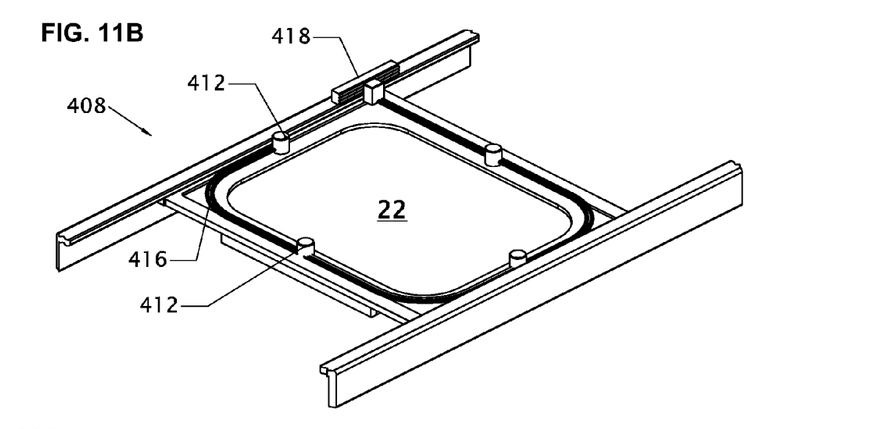
FIG. 11B is a pictorial illustration of the pallet with gripper covers omitted to expose the shape-changing devices.
Figure 11C:
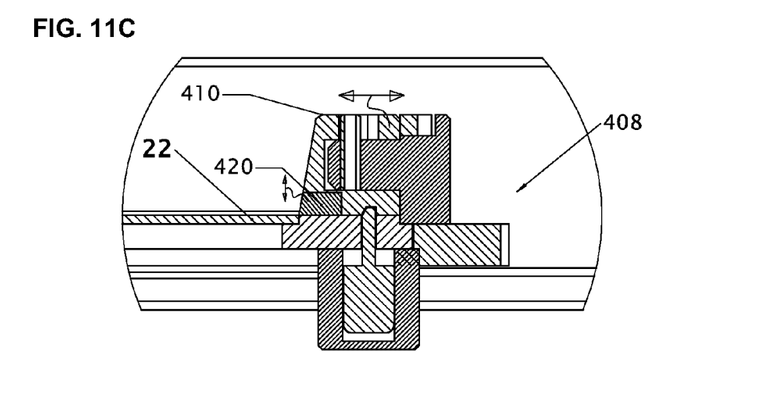
FIG. 11C is a sectional illustration of the shape-changing gripper.

Reference is now made to FIGS. 11A-11C, which illustrate a pallet 408, constructed and operative in accordance with still another embodiment of the present invention. In this embodiment, pallet 408 includes shape-changing grippers 410, such as piezoelectric or bimetallic grippers. Such grippers are known in the art, and are described, for example, in U.S. Pat. No. 5,788,453. Basically, in a piezoelectric gripper, application of a source voltage sets up stresses and strains in a piezoelectric material, thereby causing the piezoelectric material and gripper to move to a position that grips or holds the billet. Combination piezoelectric actuators are also known in the art which operate by orienting the piezoelectric material within a non-piezoelectric material in such a way that, upon movement of the piezoelectric material due to the application of the source voltage, the piezoelectric material creates stresses in the non-piezoelectric material that cause the non-piezoelectric material to move over a greater range than that possible by the piezoelectric material by itself.

In a bimetallic gripper, a bimetallic material has two metallic layers separated by an electrical and thermal insulator. The first layer of the bimetal may be heated to a greater degree than the second layer, as for example by applying a voltage to the first layer, so that thermal expansion causes the first layer to elongate more than the second layer. This causes an uneven thermal expansion of the two layers and thereby causes the gripper to move to a position that grips or holds the billet.

Shape-changing grippers may also be made of a shape-memory alloy, such as nitinol.

Pallet 408 may include a tray with a peripheral billet support surface, as in the other embodiments of the invention. Shape-changing grippers 410 (four are shown) may be mounted on a frame and arranged for linear motion inwards towards (as indicated by arrows 411) and outwards from the center of tray.

Pallet 408 operates similarly to pallet 308, except for the grippers which are shape-changing grippers 410. Instead of the holding tooth 130 of pallet 308, pallet 408 may include a solenoid 412 that selectively moves a holding pin 414 up and down to either hold gripper 410 in place or release gripper 410. (Holding in 414 may move in and out of a groove similarly to the groove 111 in FIG. 9D. The solenoids 412 are thus examples of electrically actuated devices that can hold the grippers in place in the gripping position.) The solenoids 412 may receive electrical current from a power source (not shown) via electrical wiring 416 and electrical brushes 418. Each shape-changing gripper 410 may include a shape-changing element 420, such as a piezoelectric element, bimetallic element or shape-memory element. Upon energization of the shape-changing elements 420, the shape-changing grippers 410 move (as indicated by arrows 411) to a gripping position for gripping the billet 22. The shape-changing grippers 410 may be released by de-energization or different energization of the shape-changing elements 420.

The scope of the present invention includes both combinations and subcombinations of the features described hereinabove as well as modifications and variations thereof which would occur to a person of skill in the art upon reading the foregoing description and which are not in the prior art.

What is claimed is:

1. Thermoforming apparatus comprising:
a pallet for use with a thermoforming machine that thermoforms a plastic billet into a usable form, said pallet comprising a billet support surface for supporting thereon a billet, and a gripper mounted on said pallet and arranged for movement between a first position, wherein said gripper does not grip a billet placed on said billet support surface, and a second position, wherein the gripper grips the billet placed on said billet support surface; and
a thermoforming machine that comprises a plurality of stations for storing, transporting and scraplessly transforming a billet into an object, wherein the billet is transported in said pallet from one station to another station;
wherein one of said stations comprises a pressure vacuum station for solid-phase thermoforming said billet into an object, said pressure vacuum station comprising an upper pressure unit arranged to move down against said billet and a lower vacuum molding unit arranged to move up and against said billet from an underside thereof, wherein when said upper pressure unit moves down against said billet, an inclined surface of said upper pressure unit abuts against an inclined surface of said gripper such that said upper pressure unit displaces said gripper outwards and away from said billet so that said billet is now held by said upper pressure unit and not by said gripper.

2. The thermoforming apparatus according to claim 1, wherein said gripper is arranged for linear movement between said first and second positions.

3. The thermoforming apparatus according to claim 1, wherein said gripper is arranged for rotational movement between said first and second positions.

4. The thermoforming apparatus according to claim 1, wherein said gripper grips the billet by pressing the billet against said billet support surface of said pallet.

5. The thermoforming apparatus according to claim 1, further comprising a plurality of grippers, wherein each individual gripper is independently actuable to move between said first and second positions.

6. The thermoforming apparatus according to claim 1, further comprising a plurality of grippers, wherein all the grippers are actuable to move together between said first and second positions.

7. The thermoforming apparatus according to claim 6, further comprising a cam frame connected to said grippers by actuator arms, wherein movement of said cam frame and said actuator arms moves said grippers between said first and second positions.

8. The thermoforming apparatus according to claim 1, wherein said gripper is held in place in said second position by means of a biasing device.

9. The thermoforming apparatus according to claim 1, wherein said billet support surface supports a peripheral underside of said billet.

10. The thermoforming apparatus according to claim 1, wherein said gripper is held in place in said second position by means of geometric locking.

11. The thermoforming apparatus according to claim 10, wherein said geometric locking comprises a guide pin disposed in one portion of said pallet that becomes geometrically locked at one end of a cam aperture formed in another portion of said pallet.

12. The thermoforming apparatus according to claim 1, wherein said thermoforming machine comprises a lower conveyor and an upper conveyor, a lift station that lifts the pallet from the lower conveyor to the upper conveyor, a loading station at which a billet is loaded onto said pallets, and a heating station for heating said billet.

13. Thermoforming apparatus comprising:
a pallet for use with a thermoforming machine that thermoforms a plastic billet into a usable form, said pallet comprising a billet support surface for supporting thereon a billet, and a gripper mounted on said pallet and arranged for movement between a first position, wherein said gripper does not grip a billet placed on said billet support surface, and a second position, wherein the gripper grips the billet placed on said billet support surface;
a thermoforming machine that comprises a plurality of stations for storing, transporting and scraplessly transforming a billet into an object, wherein the billet is transported in said pallet from one station to another station; and
a billet having a feeder element that allows one such billet to be picked from a stack of such billets and fed into said pallet.

14. The thermoforming apparatus according to claim 13, wherein said feeder element comprises a depression formed at an edge of a side of said billet.

15. The thermoforming apparatus according to claim 13, wherein said pallet comprises a billet-picking member that cooperates with said feeder element of said billet so as to pick one individual billet from the stack of billets and feed that individual billet into said pallet.

16. The thermoforming apparatus according to claim 15, wherein said billet-picking member comprises a protrusion on a frame of said pallet.

17. The thermoforming apparatus according to claim 1, wherein said gripper comprises a shape-changing gripper.

18. The thermoforming apparatus according to claim 1, wherein said gripper is held in place in said second position by means of an electrically actuated device.

* * * * *